Nov. 12, 1946.        H. C. GRANT, Jr        2,410,818
FREE WHEELING CLUTCH
Filed Sept. 7, 1942

INVENTOR
Harry C. Grant, Jr.
BY J. William Carr
ATTORNEY

Patented Nov. 12, 1946

2,410,818

UNITED STATES PATENT OFFICE 2,410,818

FREEWHEELING CLUTCH

Harry C. Grant, Jr., New York, N. Y., assignor to Specialties Development Corporation, Bloomfield, N. J., a corporation of New Jersey Application September 7, 1942, Serial No. 457,609

12 Claims. (Cl. 192—45)

The present invention relates to clutches for intermittently transmitting rotary motion from a driving member to the member to be driven.

More particularly, the invention relates to the provision of novel means for retaining balls or rollers which are ordinarily used in free-wheeling clutches as a means for providing the motion transmitting connection between the driving member and the driven member.

It has been known to form a clutch arrangement by the provision of ball or roller members between a smooth cylindrical surface and a member provided with substantially tangential surfaces to wedge against the ball or roller member, and various methods have been proposed to retain such ball or roller members in a neutral position and out of contact with one of the surfaces when the clutch is not engaging, as when the driven member has overrun the driving member.

According to my invention I provide positive means for holding the motion transmitting connecting members in a neutral position. This has the advantage that the roller or ball members are prevented from being flung about and do not wear out or damage the operating surfaces of the clutch during the free-wheeling operation thereof.

I attain this effect by providing magnetic means, which, during free-wheeling of the clutch, attract and hold the balls or rollers in a neutral and relatively fixed position with respect to one of the two rotating members of the clutch.

An object of the present invention is to provide a new and improved free-wheeling clutch which is simple in construction and has improved wearing qualities.

Another object is to provide a free-wheeling clutch wherein suitable means positively hold the motion transmitting connecting members in a neutral position during the free-wheeling operation of the clutch.

Another object is to prevent the flinging about of the motion transmitting connecting members when they are not forming a motion transmitting connection, whereby damage to the clutch and to the members is held to a minimum.

Figure 1:
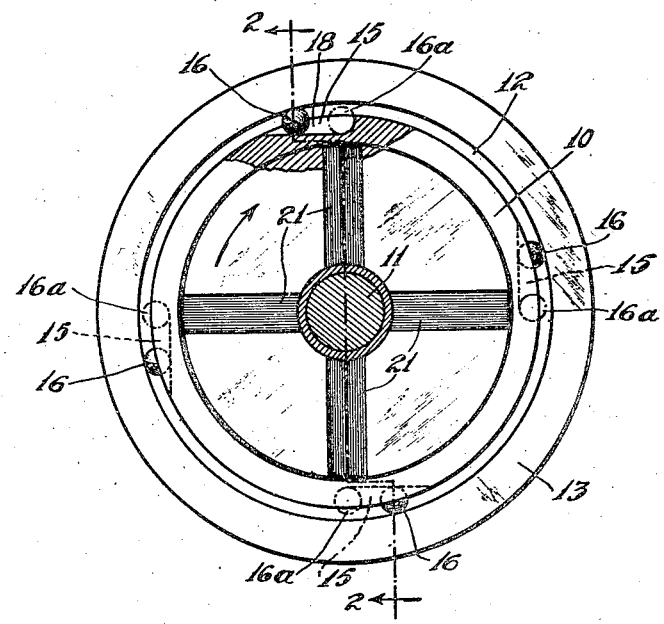
Figure 2:
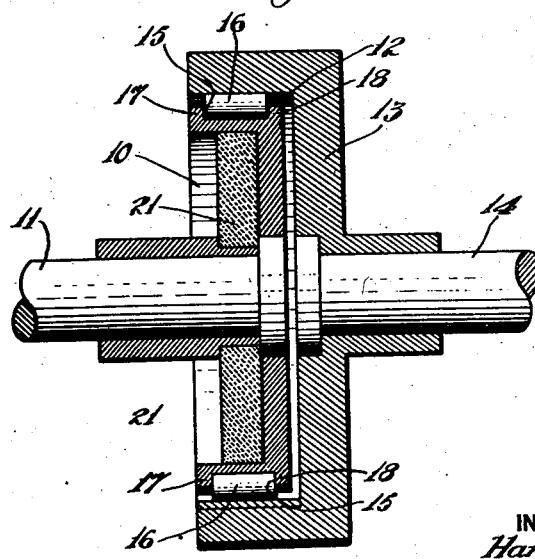

These and further objects will become apparent as my invention is described in greater detail in connection with the accompanying drawing, wherein:

Figure 1 is an elevational view of my improved clutch, shown schematically; and Figure 2 is a sectional view of the same, substantially on the line 2—2 of Figure 1.

Referring to the drawing, a driving member 10 is mounted on a driving shaft 11 in any known or desired manner. The driving member is of a substantially disc-like form and is of a size so as to fit into and freely rotate within a recess 12 of a substantially cup-shaped driven member 13. The driven member 13 may be secured on a driven shaft 14 by any preferred fastening means. The driving member 10 is provided on its periphery with a series of pockets or recesses 15, of which four are shown in the drawing. It will be understood that any other desired number of these pockets may be utilized without departing from the scope of the invention.

The pockets 15 contain members 16 of magnetic material for transmitting the driving power to the driven member, which may be cylindrical rollers, as illustrated. The bottom of each pocket 15 forms a substantially chord-like extending surface on the periphery of member 10 which is inclined in such a manner that when the driving member 10 is rotated in the direction of the arrow, the rollers 16 are made to travel up the inclined bottoms of the pockets 15, and to wedge between the pocket bottoms and the inside wall of the recess 12. The sides of the driving member 10 may be formed with suitable flanges or projections 17 and 18 to laterally retain the rollers 16 in their respective pockets.

Ordinarily, when the driving member 10 is at rest, several of the rollers 16 are in the deep ends of the pockets, as indicated in broken lines at 16a, and will be out of engagement with the wall of the recess 12. Some of the rollers, however, due to gravity or friction, will tend to remain half way out of the deepest part of their respective pockets, and will thus be subject to considerable flinging about due to interaction of friction, centrifugal force, and gravity during free-wheeling.

In order to overcome this undesirable condition, I have provided adjacent the deep ends of each of the pockets 15, a permanent magnet 21 which may be arranged diametrically with respect to the member 10 and may be embedded in the body of the member 10 or otherwise secured thereto. The outside poles of these magnets are positioned substantially adjacent the deep ends of the pockets and exert a constant attracting force on the rollers, so that, as soon as relative rotation between members 10 and 13 ceases or when the driven member overruns the driving member, the rollers 16 will be attracted toward and positively held in the deep ends of their respective pockets.

The driving and driven members of course are formed of substantially non-magnetic material.

The magnetic attraction is of such a magnitude that the rollers are retained only until a proper predetermined centrifugal force is effective, that is, when the member 10 has attained a given rotative speed in the direction of the arrow.

The construction shown herein, for purposes of illustration, may be varied to suit requirements or preferences. The relation of the driving and driven members may be reversed, the motion transmitting connecting members 16 may be ball bearing or the like, and the shape of the pockets may be any desired form.

It will be readily seen that, when the relative motion of members 10 and 13 is such that the engagement by the members 16 of both the members 10 and 13 is no longer necessary, the attracting force of the magnets operates to positively maintain the members 16 out of contact with the member 13 by attracting them and holding them in the deep ends of the pockets. Bouncing and flinging about of the roller members is thus prevented, and the life of the friction surfaces of the clutch members is thereby greatly prolonged.

From the foregoing description, it will be seen that the present invention provides an improved free-wheeling clutch which is generally adapted for use where intermittent transmission of power is employed, and which overcomes the disadvantages of the clutches proposed heretofore in accordance with the objects set forth herein.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In a free-wheeling clutch mechanism, the combination of a driving member and a cup-shaped driven member receiving said driving member and with said members being capable of free rotation with respect to each other, said driving member having one or more recesses increasing in depth in a circumferential direction, a wedging member of magnetic material in each of said recesses adapted to be moved into a wedging position between said members by a force established upon rotation of said driving member, and magnet means rotatable with said driving member and disposed adjacent the deep end of each of said recesses for urging and retaining said wedging member in the deep end of its recess.

2. In a free-wheeling clutch mechanism, the combination of a driving member and a driven member embracing said driving member and with said members being capable of free rotation with respect to each other, said driving member having one or more recesses increasing in depth in a circumferential direction, a wedging member of magnetic material in each of said recesses adapted to be moved into a wedging position between said members by a force established upon rotation of said driving member, and magnet means adjacent the deep end of each of said recesses for urging and retaining said wedging member in the deep end of its recess.

3. In a free-wheeling clutch mechanism, the combination of a cylindrical driving member and a cup-shaped driven member adjacent each other and capable of free rotation with respect to each other, said driving member being disposed in said driven member and having its peripheral face spaced from the inner circumferential face of said driven member, said peripheral face having one or more recesses increasing in depth in a circumferential direction, a wedging member of magnetic material in each of said recesses adapted to be moved into a wedging position between said faces by a force established upon rotation of said driving member, and magnet means adjacent the deep end of each of said recesses for urging and retaining said wedging member in the deep end of its recess.

4. In a free-wheeling clutch mechanism, the combination of a driven member and a driving member arranged within said driven member, said members capable of free rotation with respect to each other and said driving member having one or more recesses increasing in depth in a circumferential direction, a wedging member of magnetic material in each of said recesses adapted to be moved into a wedging position between said members by a force established upon rotation of said driving member, and magnet means adjacent the deep end of each of said recesses for urging and retaining said wedging member in the deep end of its recess.

5. In a free-wheeling clutch mechanism, the combination of a disc-like driving member and a cup-shaped driven member receiving said driving member in spaced relation therewith, said members being capable of free rotation with respect to each other, said driving member having one or more recesses increasing in depth in a circumferential direction, a wedging member of magnetic material in each of said recesses adapted to be moved into a wedging position between said members by a force established upon rotation of said driving member, and magnet means embedded in said driving member adjacent the deep end of each of said recesses for urging and retaining said wedging member in the deep end of its recess.

6. In a free-wheeling clutch mechanism, the combination of a driven member and a driving member arranged within said driven member, said members capable of free rotation with respect to each other and said driving member having one or more recesses increasing in depth in a circumferential direction, a wedging member of magnetic material in each of said recesses adapted to be moved into a wedging position between said members by a force established upon rotation of said driving member, and magnet means on said driving member adjacent the deep end of each of said recesses for urging and retaining said wedging member in the deep end of its recess.

7. In a free-wheeling clutch mechanism, the combination of a driving member and a driven member arranged about said driving member and with said members being capable of free rotation with respect to each other, said driving member having one or more recesses increasing in depth in a circumferential direction, a rotatable wedging member of magnetic material in each of said recesses adapted to be moved into a wedging position between said members by a force established upon rotation of said driving member, and magnet means for each of said recesses and disposed adjacent the deep end of each of said recesses for urging and retaining said wedging member in the deep end of its recess.

8. In a free-wheeling clutch mechanism, the combination of a driven member and a driving member arranged within said driven member, said members capable of free rotation with respect to each other and said driving member having one or more recesses increasing in depth in a circumferential direction, a rotatable wedging member of magnetic material in each of said recesses adapted to be moved into a wedging position between said members by a force established upon rotation of said driving member, and magnet means on said driving member adjacent the deep end of each of said recesses for urging and retaining said wedging member in the deep end of its recess.

9. In a free wheeling clutch mechanism, the combination of a driven member and a driving member arranged within said driven member, said members being capable of free rotation with respect to each other and said driving member having one or more recesses, a clutch element of magnetic material in each of said recesses adapted to be moved into clutching relation between said members by a force established upon rotation of said driving member, and magnetic means adjacent said recesses for urging and retaining said clutch element out of engagement with said driven member.

10. In a clutch mechanism, a pair of substantially nested clutch members capable of relative rotation, magnetic responsive clutch means carried by the inner member and operable when subjected to a predetermined force upon rotation of said inner member to establish a clutched relation with the outer member for effecting unitary rotation of said members, and magnetic means counteracting any tendency of said clutch means towards establishing said relation until said predetermined force prevails.

11. In a clutch mechanism, a rotatable driving member provided with an annular clutch face having a recess therein, a driven member mounted for rotation relative said driving member and having an annular face adjacent and opposed to said face of said driving member, magnetic responsive clutch means movably disposed in said recess operable upon rotation of said driving member to establish a clutched relation between said faces for effecting unitary rotation of said members, and magnetic means counteracting any tendency of said clutch means to establish said relation until said clutch means are subjected to a predetermined force established by rotation of said driving member.

12. In a clutch mechanism, a driving member mounted for rotation having an annular clutch face provided with a plurality of circumferentially spaced inclined recesses increasing in depth in a circumferential direction, a driven member mounted for rotation relative to said driving member and having an annular face adjacent and opposed to said face of said driving member, magnetic responsive clutch means freely movably disposed in each of said recesses operable upon rotation of said driving member to establish a clutched relation between said faces for effecting unitary rotation of said members, and magnetic means for maintaining said clutch means in the deeper portions of said recesses to counteract any tendency of said clutch means to establish said relation until said clutch means are subjected to a predetermined force established upon rotation of said driving member.

HARRY C. GRANT, Jr.